May 16, 1950 J. TELASCO 2,508,201
STICK HOLDER FOR FROZEN LOLLIPOPS
Filed Oct. 1, 1946
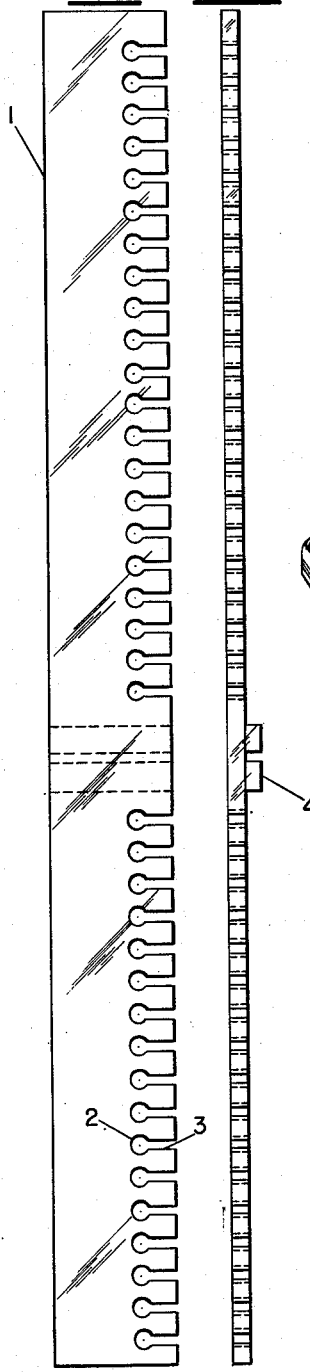
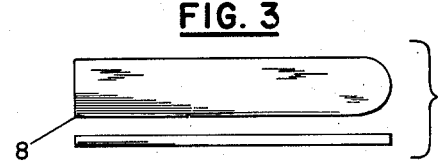
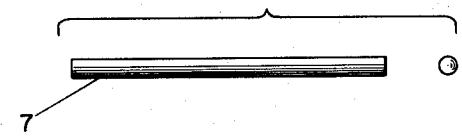
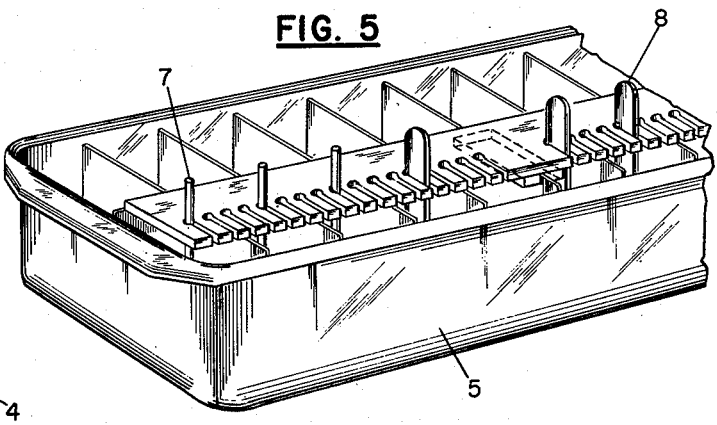
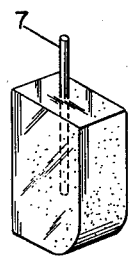
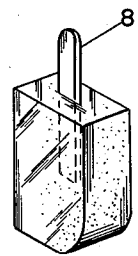
INVENTOR
JOSEPH TELASCO
ATTORNEYS Patented May 16, 1950

2,508,201

UNITED STATES PATENT OFFICE 2,508,201

STICK HOLDER FOR FROZEN LOLLIPOPS

Joseph Telasco, New York, N. Y.

Application October 1, 1946, Serial No. 700,409

4 Claims. (Cl. 294—87)

This invention relates to a rack or stick-holder to be used in the manufacture of frozen confections on sticks in the freezing unit of a domestic refrigerator. Various complicated mechanisms have been proposed and are in use for the commercial manufacture of such confections—which I shall refer to as frozen lollipops—and these include means for holding the sticks, but so far as I am aware, no means have been provided whereby such confections may be simply and easily made in a domestic refrigerator without the necessity for making any change whatsoever in the structure of the freezing unit of that refrigerator or of its ice trays. It is the object of the present invention to provide such means.

In achieving this object I have employed a rack or stick-holder in the form of a flat bar designed to overlie the transverse partitions of an ice-cube tray, and provided with a multiplicity of spaced holes or openings for the reception of sticks. As ice trays vary in size and design so that the spacing of the transverse partitions is by no means uniform, the provision of a multiplicity of openings enables the user of my holder to center the sticks, one in each ice compartment, or, in any event, to place each stick near enough to the center for all practical purposes. I have also provided openings of keyhole shape so that the rack is capable of accommodating either round or flat sticks. Finally, in order that the rack, once set, shall not be dislodged longitudinally when the tray is shoved into the refrigerating unit and the centering of the sticks thereby disturbed, I provide the bottom of the rack with means for engaging one of the transverse partitions of the ice tray.

In the accompanying drawings I have illustrated a preferred embodiment of my invention. In these drawings:

Figure 1 is a plan view of one of my racks, or stick-holders, showing the spaced, stick-receiving openings;

Figure 2 is a front elevation of the stick-holder shown in Figure 1;

Figure 3 is a top and edge view of a flat stick designed for use with my rack;

Figure 4 is a side and end view of a round stick;

Figure 5 is a perspective view of one end of an ice-cube tray, showing my stick-holder mounted thereon with a number of sticks in position; and Figures 6 and 7 are perspective views of two of the finished confections—Figure 6 showing the confection on a round stick and Figure 7 showing it on a flat stick.

The rack, or stick-holder, shown in these drawings comprises a flat, elongated rectangular strip or bar 1, preferably of plastic material, along one edge of which are a multiplicity of equi-spaced keyhole slots, each having a round portion 2 and a flat portion 3. On the lower face of the stick-holder near its middle section are two cross blocks 4 spaced apart a distance slightly greater than the thickness of the transverse partition of an ice-cube tray.

To use the stick-holder of the present invention it is placed over an ice-cube tray 5 filled with the liquid to be frozen, the cross blocks 4 straddling one of the transverse partitions 6, as shown in Figure 5. Sticks, either round 7 or flat 8, are then inserted into the opening which comes closest to the middle of each ice compartment, and pressed down until their lower ends extend well within the liquid and their upper ends extend above the stick-holder a distance less than the space between the stick-holder and the overlying horizontal partition in the freezing unit. The openings are of such size as to engage the sticks snugly and hold them by frictional engagement at any desired setting. The tray is then shoved into the unit and kept there until the freezing is complete. Thereupon the tray is removed, the stick-holder lifted off, and the frozen cubes separated from the partitions in the usual manner. The result is an array of frozen lollipops of ice, frozen fruit juices, or ice cream, as the case may be.

The great virtue of a stick-holder constructed in accordance with the present invention is the simplicity and the ease by which it can be adapted for use in any current domestic refrigerator. For a small sum, the housewife may provide herself with a tool which will enable her to make home-made frozen lollipops at little expense.

I claim:

1. A stick-holder for making frozen lollipops comprising a flat bar adapted to lie flat on the top of an ice-cube tray of a domestic refrigerator and having a multiplicity of closely-spaced, stick-receiving openings extending inwardly from one side edge thereof.

2. A stick-holder for making frozen lollipops as set forth in claim 1 in which the stick-receiving openings are of keyhole shape.

3. A stick-holder for making frozen lollipops as set forth in claim 1 which also includes means secured to the bar and extending substantially normal to one flat face thereof to prevent dislodgement of the stick-holder by engagement with an element of an ice-cube tray when in position on an ice-cube tray.

4. A stick-holder for making frozen lollipops as set forth in claim 1 which also includes cooperating means secured to said bar and closely spaced longitudinally thereof and extending substantially normal to one flat side face thereof to straddle the upper edge of a transverse partition of an ice-cube tray and prevent dislodgement of the stick-holder when the latter is in place on an ice-cube tray.

JOSEPH TELASCO.

REFERENCES CITED

The following references are of record in the file of this patent:

UNITED STATES PATENTS

| Number | Name | Date |
|---|---|---|
| 1,221,584 | Patrick | Apr. 3, 1917 |
| 2,172,183 | Thomas | Sept. 5, 1939 |
| 2,175,324 | Stamp | Oct. 10, 1939 |